(No Model.)
A. JANIN.
AMALGAMATING SILVER ORES.
No. 468,063. Patented Feb. 2, 1892.
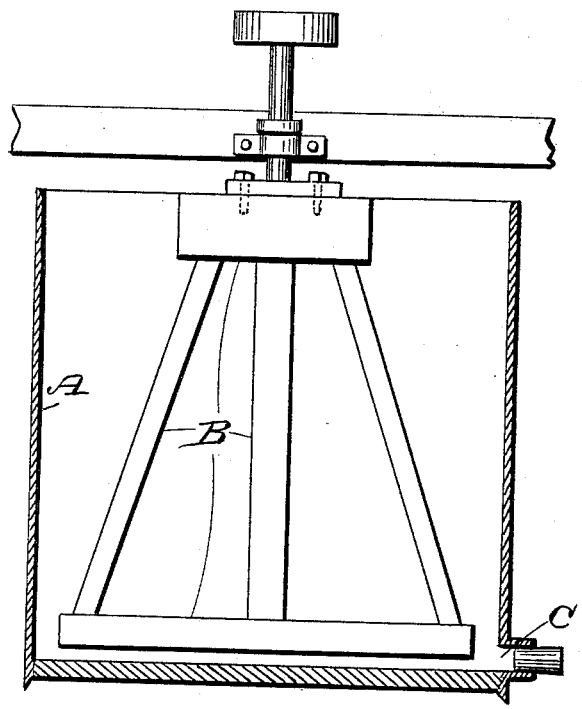
Witnesses:
St. Towrse
J. A. Bayless
Inventor,
Alexis Janin
By Dewey & Co.
Attys

UNITED STATES PATENT OFFICE.

ALEXIS JANIN, OF SAN FRANCISCO, CALIFORNIA.

AMALGAMATING SILVER ORES.

SPECIFICATION forming part of Letters Patent No. 468,063, dated February 2, 1892.

Application filed December 6, 1889. Serial No. 332,819. (No model.) Patented in Mexico April 9, 1890.

*To all whom it may concern:*

Be it known that I, ALEXIS JANIN, a citizen of the United States, residing in the city and county of San Francisco, State of California, have invented certain new and useful Improvements in the Art of Amalgamating Silver Ores, (which have been patented by me in Mexico, said patent being dated April 9, 1890, and bearing no number;) and I hereby declare the following to be a full, clear, and exact description of the same.

The accompanying drawing, to which reference is made, shows a suitable apparatus for carrying out the stirring, hereinafter mentioned.

I have found that free hypochlorous acid has a powerful effect in weak solutions and at ordinary temperatures in chloridizing or otherwise rendering more easily amalgamated certain minerals of silver, while under the same conditions it does not attack at all or only slowly the sulphides of the baser metals. In this it differs from the action of free chlorine, which combines at once with sulphides of iron or copper. Neither does hydrochlorous acid combine with carbonates of the metals or alkaline earths, as is the case with chlorine gas.

My process is principally applicable to oxidized ores and to ores carrying sulphides of silver or silver minerals containing only a small proportion of baser metals; but not to galenas or similar ores in which the silver is chemically combined with a large excess of baser metals. When ores contain an appreciable quantity of carbonate of lime or other substances which decompose acid-salts, the chemicals ordinarily used in the amalgamation process, such as sulphate of copper and salt, cannot be employed, as the chloride of copper is decomposed by carbonate of lime, and its chloridizing action prevented; but a solution containing free hypochlorous acid will chloridize or otherwise render more easily amalgamated certain minerals of silver contained in such ores without attacking the carbonates of which the gangue may be composed. The simplest method of forming a solution containing free hypochlorous acid consists in adding dilute sulphuric acid or certain soluble salts—such as zinc sulphate, or ferric sulphate—to a solution of chloride of lime; or hyperchlorous acid may be produced by introducing carbonic-acid gas into a similar solution. For practical purposes the so-called "chloride of lime" may be considered as being a mixture of calcium chloride and hypochlorite of lime, and when sulphuric acid is added to such a solution for the purpose of producing free hypochlorous acid then the sulphuric acid should be used only in sufficient quantity to combine with the calcium-oxide of the hypochlorite of lime or but little in excess of such quantity. The acid must also be largely diluted with water and the solution of the chloride of lime must be kept in constant agitation during the introduction of the acid to prevent local supersaturation. In this way the calcium chloride of the chloride of lime will be but little attacked by the dilute acid. So much of it, however, as may be attacked will yield first hydrochloric acid which will combine with a portion of the free hypochlorous acid present and form free chlorine. Should so much acid be added to the solution of chloride of lime as to decompose both the calcium chloride and the hypochlorite of lime, then there would remain only free chlorine in the solution. Unless the solution were greatly diluted or the mixture were effected in air-tight apparatus, this chlorine would escape as a gas injurious to health and comfort. Hypochlorous acid, on the contrary, is a liquid not volatile at ordinary temperatures and possessing no obnoxious qualities. Hence it permits of the use of ordinary open apparatus.

In practice the solution of hypochlorous acid may be formed either in contact with the ore or in a special apparatus, and then added to the ore. According to the first method, the chloride of lime should first be added to the ore, and when it is dissolved the dilute acid in sufficient quantity only to decompose the hypochlorite of lime of the so-called "chloride of lime" should be added gradually while the whole mixture of ore and solution is in constant motion. If the gangue of the ore consists largely of carbonates, an acid added to the ore will combine with the carbonates and liberate carbonic-acid gas, which in its turn will generate hypochlorous acid in the solution of chloride of lime present, even if the acid be used in excess of the proportions which would otherwise be chemically sufficient to liberate chlorine gas from the same quantity of chloride of lime. The same principle applies to ores which contain substances that will unite with acid added to the ore and form salts having the property of liberating hypochlorous acid from a solution of chloride of lime.

Free hypochlorous acid has an injurious effect on mercury, producing an oxychloride of that metal which is not brought back to the metallic state by the subsequent addition of iron or other metals. Therefore the ore should first be submitted to the preliminary treatment with hypochlorous acid in a separate apparatus, as the ordinary amalgamating-pan generally retains constantly a considerable amount of quicksilver as amalgam or in the liquid state. From this first or mixing apparatus, which should be made of wood or of some substance not acted upon by hypochlorous acid or free chlorine, the ore is discharged into the ordinary amalgamating-pan after the preliminary treatment with hypochlorous acid has accomplished its purpose. If the preliminary treatment be sufficiently prolonged, the free hypochlorous acid will in some cases gradually combine with the ingredients of the ore and will no longer be injurious to mercury; but generally there will still remain free hypochlorous acid in the mixture of ore and solution, and it will therefore be necessary to add a substance which will convert the hypochlorous acid into a combination having little or no injurious action on the mercury subsequently to be added. For this purpose there may be used a variety of substances—such as a caustic alkali or alkaline earth—which on heating will form a chlorate with the hypochlorous acid; or there may be employed sodium-sulphite or bisulphite of lime, or an alkaline hyposulphite which will convert the hypochlorous acid into hydrochloric acid, or ferrous sulphate which will form a metallic chloride. The same substances will also combine with any free chlorine present, which would also have an injurious effect on mercury and form with it new combinations having no such injurious action.

An apparatus in which the ore may be chloridized or prepared for the subsequent amalgamation is shown in the accompanying drawing, and consists of a tub A, provided with a stirrer B and discharge-orifice C. As in all apparatus of this kind, the stirrer should be set in motion before the charging of the ore begins. The ore and the necessary amount of water to form a semi-liquid pulp are then thrown in together with the chloride of lime. Hypochlorous acid is then generated in the pulp by the action of sulphuric acid or of one of the salts known in chemistry to have the property of liberating hypochlorous acid in a solution of chloride of lime. The stirring of the pulp continues until the silver minerals are chloridized and the hypochlorous acid present has formed combinations having no injurious action on mercury, either through being absorbed by ingredients of the ore or through the action of substances added for the purpose. The discharge-orifice is then opened and the pulp is conveyed into the amalgamating-pan, where the amalgamation is concluded in the usual manner, or the water and chloride of lime can be charged first into the chloridizing apparatus. Dilute acid in the proportion required to form hypochlorous acid is then run in gradually while the stirrer is in motion, and the ore is added afterward. If the acid be added to the mixture of ore and chloride of lime in the tub, it must also be used in such proportions as will produce the smallest quantity of chlorine gas. This gas would escape in fumes injurious to health or combine with sulphides of the baser metals in the ore before chloridizing the silver minerals present. The amount of sulphuric acid used will vary with the purity of the chloride of lime. With acid of sixty-six degrees the quantity will generally be from twenty-five to thirty per cent. of the weight of the chloride of lime. I generally use per ton of ore ten pounds of chloride of lime, containing thirty-five per cent. of effective chlorine and two and one-half to three pounds of sulphuric acid diluted with ten to twenty times its weight of water. It is best to mix the bleaching-powder with water before adding it to the ore; otherwise it has a tendency to form balls. The sulphuric acid with the necessary amount of water for its dilution is placed in a lead-lined box provided with a faucet, whence it is run into the chloridizing-tub. When the bleaching-powder varies in strength or when operating with new ores, I determine the most appropriate quantities and relative proportions of chloride of lime and of acid by dipping litmus-paper into the mixture of ore and solution in which hypochlorous acid has been formed and noting the strength of the bleaching action on the paper when using different quantities of chloride of lime and of acid. I determine in the same way whether the quantities of chemical reagents used are sufficient to insure the persistance of hypochlorous acid in the pulp until the silver minerals are chloridized, as shown by the yield of the ore in the subsequent amalgamation. These are factors that will vary with different ores, and the method I have indicated for determining these points has shown itself in practice to be accurate and reliable. I also test with litmus-paper whether the hypochlorous acid is decomposed before the ore is conveyed into the amalgamating-pan, and the appearance of the mercury subsequently added serves to confirm this test. If instead of sulphuric acid a soluble salt—such as the sulphates of alumina or magnesia or others already named—should be employed for generating hypochlorous acid, they should be used in proportion to their combining weights with chloride of lime. Even when added in excess to a solution of chloride of lime these salts will produce only hypochlorous acid, whereas an excess of acid will form chlorine gas, unless it be added to a solution of chloride of lime in contact with ores whose component parts will unite with more or less of the acid and prevent its direct action on the chloride of lime. When it is found that litmus-paper dipped into the pulp ceases to be bleached before the silver minerals are chloridized, unless the chemical reagents be used in quantities beyond economical limits, then the ore in question is not adapted to treatment by this process in the same way that other chemicals used in the amalgamation process are decomposed more rapidly by some ores than by others.

I do not claim herein the generic use of chloride of lime and an acid in the amalgamation of silver ore, and more particularly not when these substances are added to the ore in conjunction with the mercury. In this latter connection I may state at this point that processes have been suggested heretofore which call for the introduction of chlorine gas or chloride of lime with an acid into the pulverized ore with the mercury. The result of these methods of treatment would be that the chlorine would combine almost instantaneously with the mercury, forming calomel and would not be free to chloridize the silver minerals present. The formation of calomel would cause an excessive loss of mercury, and the calomel formed would have no effect in chloridizing silver minerals. The effect of any method of generating chlorine gas in conjunction with mercury is to form calomel which has no effect in chloridizing silver minerals and causes great loss of mercury, as the calomel would not return to the metallic state by being brought in contact with scraps of iron in a second apparatus, as has been suggested. The use of chloride of lime and an acid for the purpose of generating chlorine gas, as has been suggested in the previous methods, would necessitate the use of hermetically-closed apparatus, or the chlorine would escape as a gas dangerous to health and comfort or form calomel with the mercury present. Any hypochlorous acid formed at the same time would combine with the mercury used simultaneously with the chloride of lime and acid and form oxychloride of mercury, which acts even more disadvantageously than calomel in the amalgamation process.

In my process I use no mercury in the chloridizing-tub into which the chloride of lime and acid are introduced. Consequently the hypochlorous acid is free to act upon and chloridize the silver minerals, and I only discharge the ore into the amalgamating-pan after the hypochlorous acid or traces of chlorine in the pulp have been converted into other forms which will not combine with the mercury. Hence no calomel or oxychloride of mercury are formed, and the amalgamation of the silver minerals is effected under the most favorable conditions. By using an open chloridizing-tub instead of a barrel, I render the charging and discharging of the ore more rapid and economical.

Having thus described my invention, what I claim as new, and desire to secure by Letters Patent, is—

1. In the art of amalgamating silver ores, the process which consists in subjecting the ore to the action of free hypochlorous acid, formed by the action of carbonic-acid gas or an acid or an acid-salt on a solution of chloride of lime, agitating the mixture of ore and solution until the silver minerals are chloridized and the free hypochlorous acid or free chlorine present have formed combinations having little or no injurious action on mercury, then adding mercury, and concluding the amalgamation in the usual manner, substantially as herein described.

2. In the art of amalgamating silver ores, the process which consists in adding chloride of lime and an acid or acid-salt to the ore in a preparatory or mixing apparatus having constant access of atmospheric air, agitating the mixture of ore and solution until the silver minerals are chloridized and the free hypochlorous acid or free chlorine present have formed combinations having little or no injurious action on mercury, then conveying the pulp into the amalgamating-pan, adding mercury, and concluding the amalgamation in the usual way, substantially as herein described.

3. In the art of amalgamating silver ores, the process which consists in first agitating the ore together with the solution of chloride of lime in which free hypochlorous acid or free chlorine have been generated until the silver minerals are chloridized, and then adding to the mixture of ore and the solution above named a substance which will convert the free hypochlorous acid or free chlorine present into hydrochloric acid or form with them a chloride or other combination having little or no injurious action on mercury, then adding mercury, and concluding the amalgamation in the usual way, substantially in the manner and for the purposes described.

In witness whereof I have hereunto set my hand.

ALEXIS JANIN.

Witnesses:
J. H. BLOOD,
S. H. NOURSE.